United States Patent [19]

Gryp et al.

[11] Patent Number: 5,599,065
[45] Date of Patent: Feb. 4, 1997

[54] SEAT SWIVEL APPARATUS

[75] Inventors: Dennis J. Gryp, East Moline, Ill.; Daniel L. Burns, Muscatine, Iowa

[73] Assignee: Sears Manufacturing Company, Davenport, Iowa

[21] Appl. No.: 574,487

[22] Filed: Dec. 19, 1995

[51] Int. Cl.$^6$ .................................................. A47C 1/02
[52] U.S. Cl. ........................... 297/344.22; 297/344.21; 248/425
[58] Field of Search .................. 297/344.22, 344.21, 297/337, 334.26; 108/20, 21, 22, 94; 248/425, 429

[56]         References Cited

U.S. PATENT DOCUMENTS

| | | | |
|---|---|---|---|
| 2,845,990 | 8/1958 | Hubert | 297/344.22 X |
| 2,914,793 | 12/1959 | McMahan | 297/344.21 X |
| 3,659,895 | 5/1972 | Dresden | 297/344.22 X |
| 4,401,287 | 8/1983 | Moeser | 248/425 |
| 5,482,354 | 1/1996 | Gryp | 297/344.22 |

*Primary Examiner*—Laurie K. Cranmer
*Attorney, Agent, or Firm*—Niro, Scavone, Haller & Niro

[57]         ABSTRACT

A seat swivel apparatus which comprises an upper plate supporting a seat and a lower plate fixed to a support structure, a first generally annular bearing affixed to the upper plate and a second generally annular bearing affixed to the lower plate and being juxtaposed such that the upper plate swivels relative to the lower plate on opposing first and second bearings, and an actuator arm rotatably mounted with one of the plates to allow 180° rotation of the upper plate relative to the lower plate. The swivel apparatus can be easily interchangeable between the right and left sides of a vehicle.

13 Claims, 6 Drawing Sheets

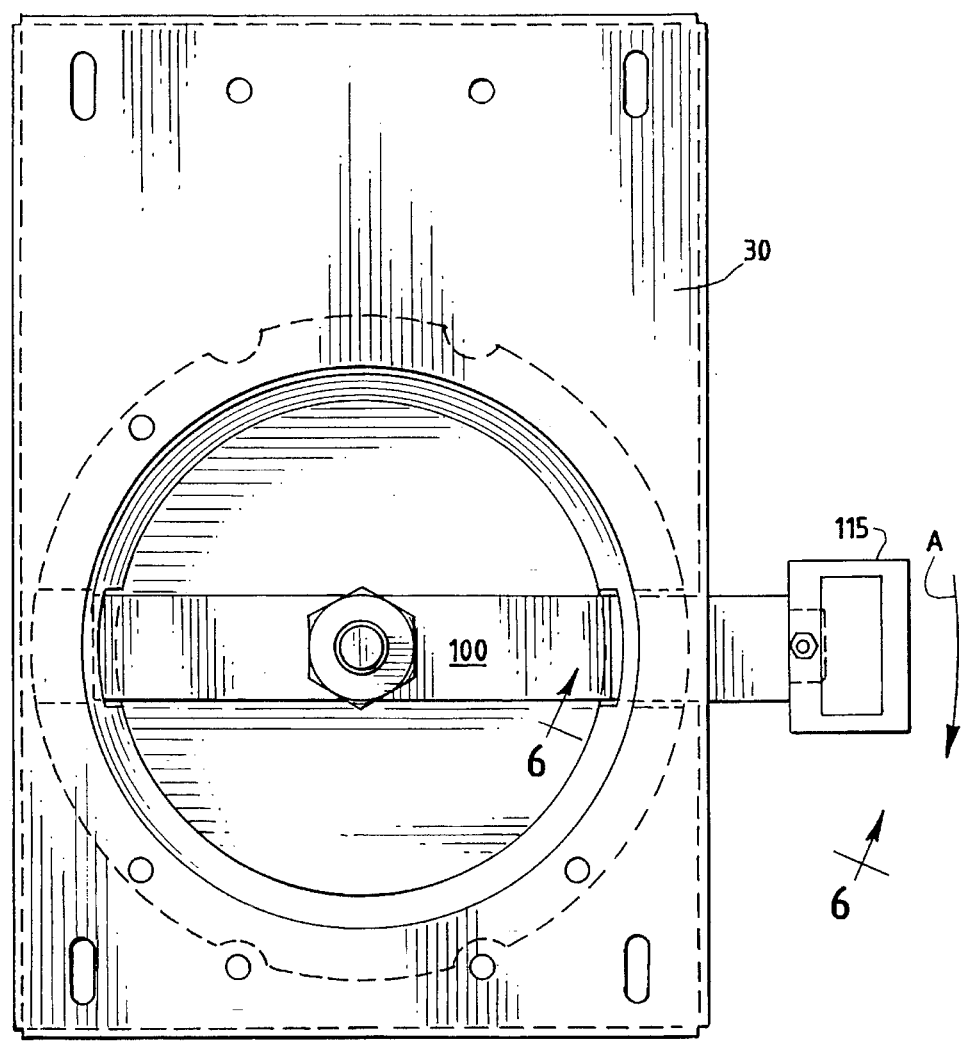
FIG. 5
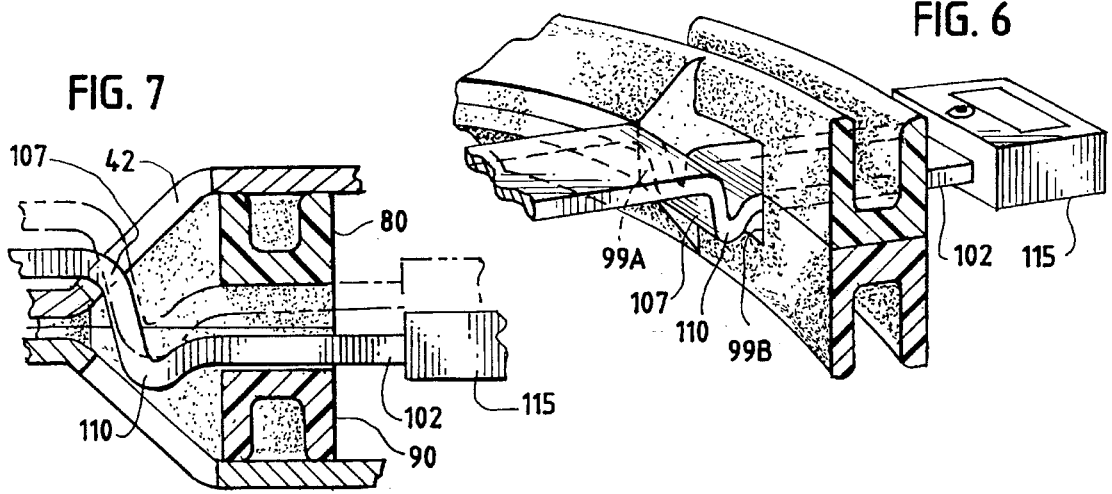
FIG. 6
FIG. 7

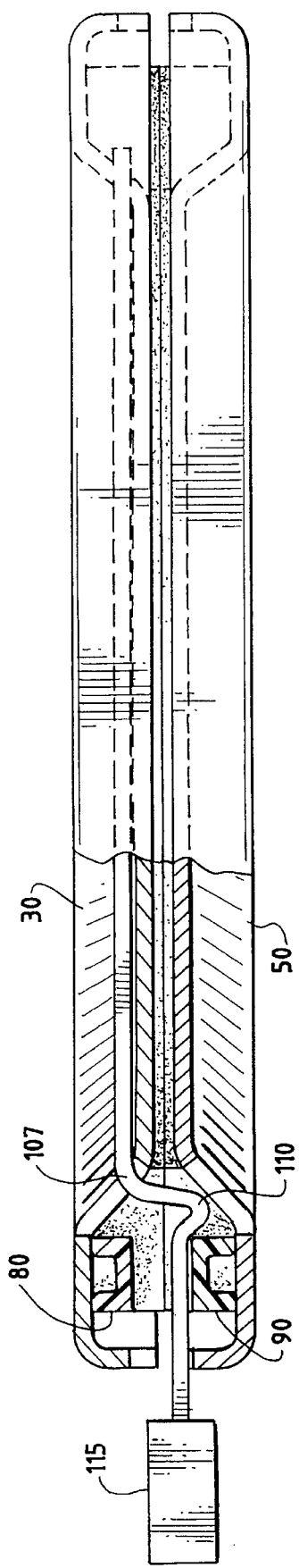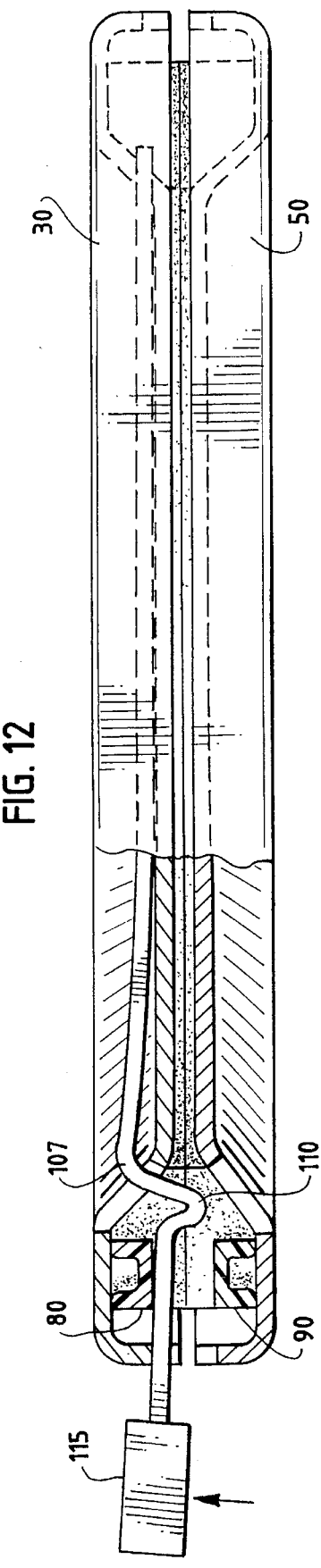

SEAT SWIVEL APPARATUS

BACKGROUND OF THE INVENTION

The present invention relates to adjustable seats and, more specifically, to a swivel apparatus employed in vehicle seats.

Vehicle seats which are adjustable and which swivel are common and in wide use today. Most swivel seats are mounted on an apparatus which utilizes ball bearings. Such systems provide a simple swivel seat but have a number of general drawbacks. First, such swivel systems can be relatively difficult to manufacture with the many small ball bearings which must be fitted into a rotational groove and held in place under specific tolerances. Second, because a swivel seat must be able to withstand significant moment arms about the axis of rotation, swivel systems utilizing ball bearings must be manufactured and assembled with sufficient rigidity to avoid separation due to the moment arm felt on the bearing. If a ball bearing swivel seat assembly is not sufficiently rigidly manufactured, the casings holding the ball bearings in place can separate, dislodging the ball bearings and causing the swivel assembly to fail.

There also exists a need in the heavy truck seating industry to provide a swivel seat which allows a vehicle seat to rotate inwardly (away from the vehicle door) a full 180 degrees to allow the seat occupant to easily access the sleeper compartment of the vehicle. Many vehicle seats in existence today do not allow 180 degree rotation. Due to the tight space limitations of vehicle cabs, and the length requirements of vehicle seats, a difficulty exists in allowing a vehicle seat to rotate 180 degrees. The present invention provides such a swivel apparatus.

Furthermore, many swivel seat apparatuses are designed specifically for either the left-hand or right-hand side of a vehicle. Few are interchangeable from the right to left and vice versa. No such vehicle seat is known to these inventors which allows full 180 degree rotation or which avoids the use of a ball bearing swivel means.

SUMMARY OF THE INVENTION

The present invention provides a swivel seat apparatus which allows one-way, 180 degree seat rotation without the use of ball bearings and which is interchangeable between the left and right sides of a vehicle.

The present invention also provides a greatly simplified swivel apparatus for a seat. The present invention utilizes an upper swivel plate and a lower swivel plate adapted to support a seat and to mount to a support structure, a generally annular bearing affixed to the lower plate with an upwardly facing bearing surface, a generally annular bearing affixed to the upper plate having a downwardly facing bearing surface, and a central swivel post defining the swivel axis located rearward of the longitudinal center of the upper and lower plates and securing together both plates such that the opposing annular bearing surfaces are juxtaposed, and a swivel actuator lever mounted to and moveable with one of the plates. The unique configuration and placement of the bearings allows greatly simplified construction, assembly and usage of the swivel apparatus as well as interchangeability of the apparatus between the left and the right sides of a vehicle. The present invention also accommodates a great deal of force exerted on the seat support structure by the seat occupant.

A primary object of the present invention is to provide a seat swivel apparatus utilizing annular bearings which allows full 180 degree rotation of a seat.

Another object of the present invention is to provide a seat swivel apparatus which allows 180 degree rotation and which is interchangeable between the left and right sides of a vehicle passenger compartment.

A further object of the present invention is to provide a seat swivel apparatus which does not require ball bearings.

A still further object of the present invention is to provide a seat swivel apparatus which can be utilized in the cab of a truck having a sleeper compartment such that the seat can rotate 180 degrees to provide easy access to the sleeper compartment.

An even further object of the present invention is to provide a seat swivel apparatus which utilizes bearings other than ball bearings and which will accommodate a significant moment arm about the rotational axis.

Another object of the present invention is to provide a seat swivel apparatus which requires little maintenance and is highly durable for efficient construction and operation.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 5 is a top view of the apparatus of the present invention as assembled for the operator's seat of a vehicle.

FIG. 6 is a partial cutaway, perspective view of the bearings and actuator lever of the present invention taken along the line 6—6 of FIG. 5.

FIG. 7 is a partial, cross-sectional view of the apparatus of the present invention showing the lever arm in the latched and actuated positions.

FIGS. 11 and 12 are side, partial cross-sectional views of the apparatus of the present invention showing the lever arm in latched and actuated positions.

DETAILED DESCRIPTION OF THE PREFERRED EMBODIMENT

Figure 1:
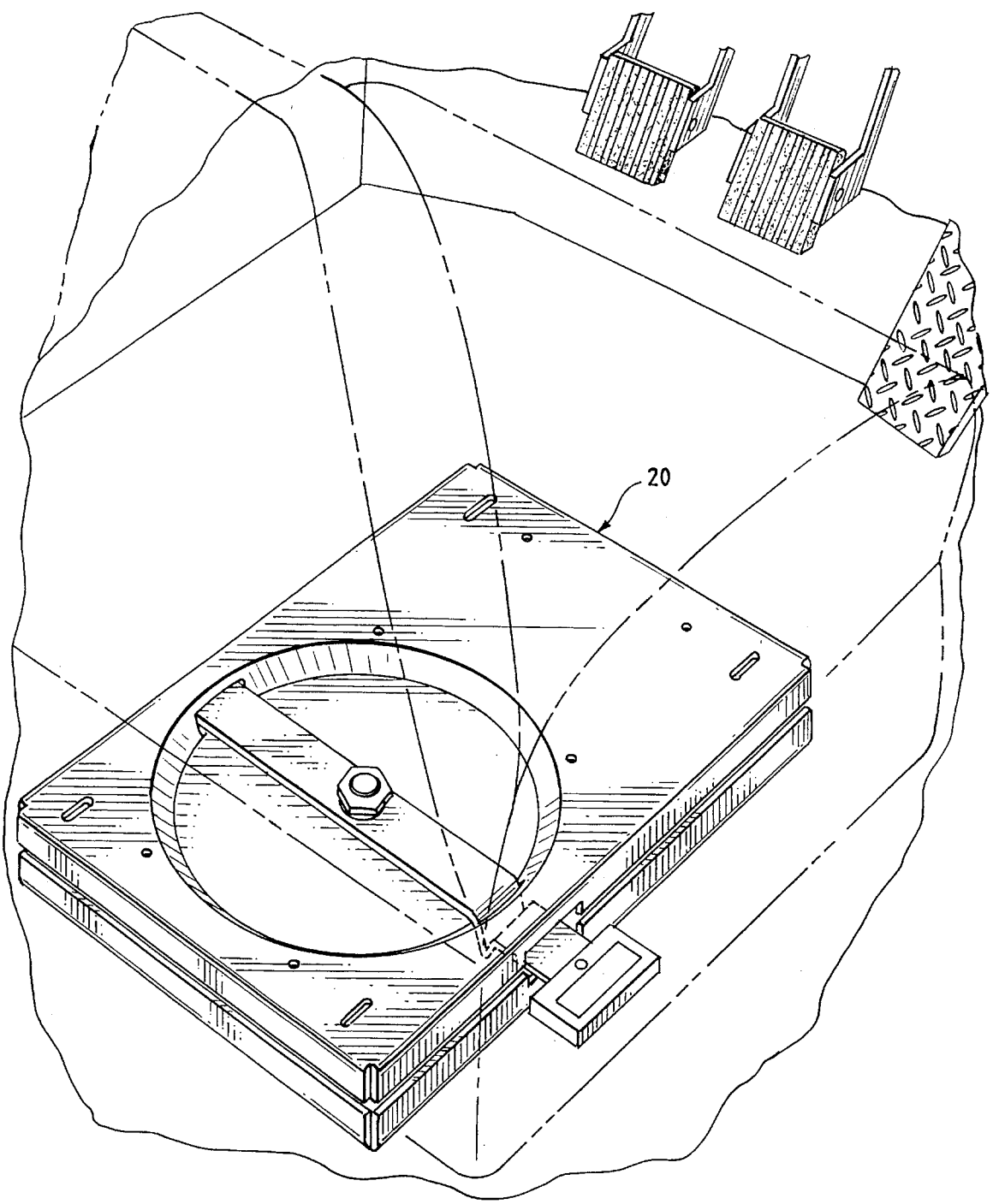
FIG. 1 is a perspective view of the present invention in an operational setting with a vehicle operator's seat.
Figure 2:
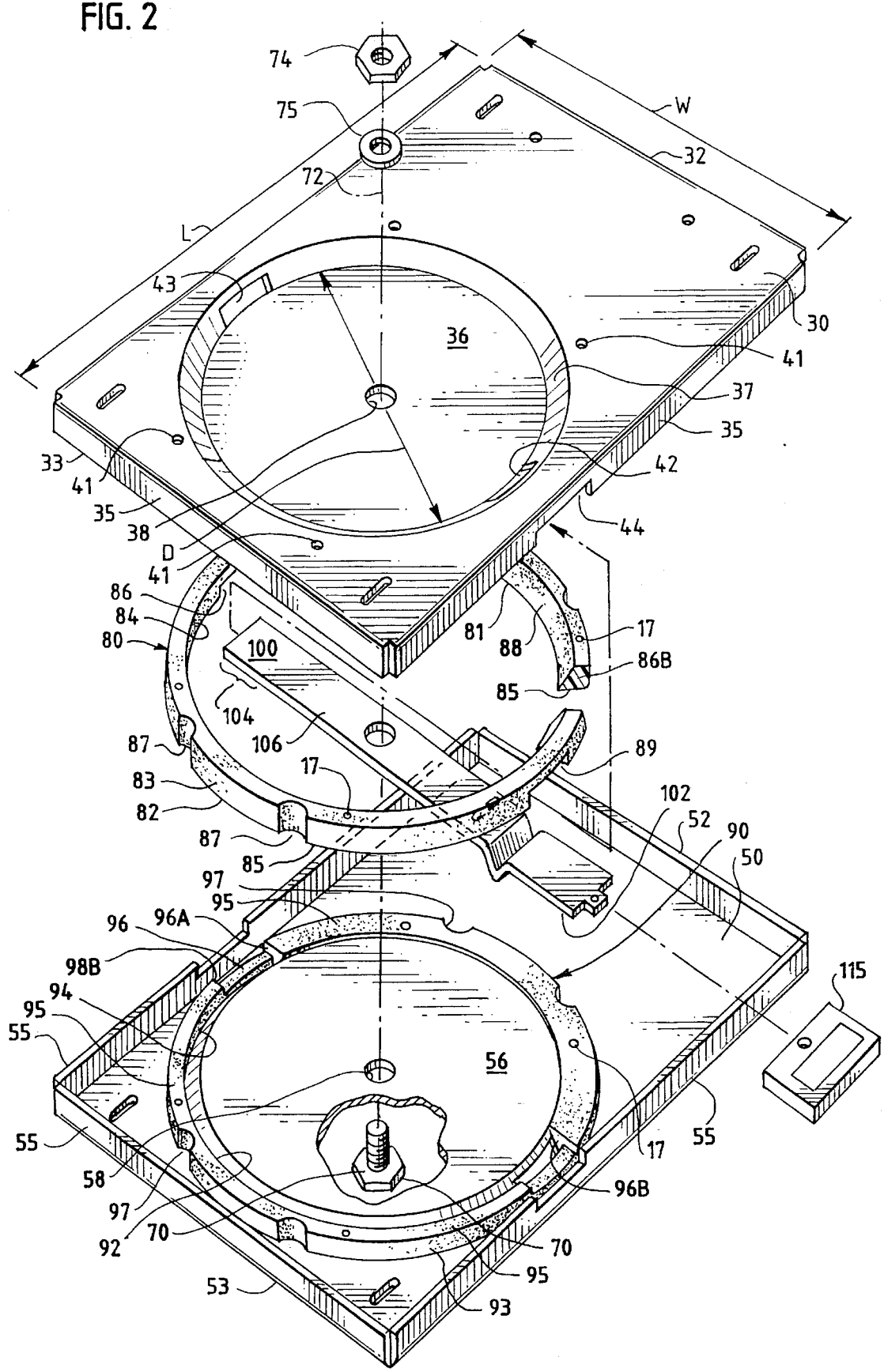
FIG. 2 is an exploded perspective view of the apparatus of the present invention.

The preferred embodiment of the present invention, as shown in FIGS. 1 and 2 and designated generally 20, includes an upper support plate 30 on which a seat is mountable, a lower support plate 50 mountable to a support structure (not shown), a first upper annular bearing 80, a second lower annular bearing 90, an actuator lever 100 disposed in one of said plates 30 or 50, and a swivel post 70 rotatably joining the two plates 30 and 50 and defining an axis of rotation 72 of the upper plate 30 relative to the lower plate 50.

Upper plate 30 and lower plate 50 are of identical construction and are shown as assembled for the left-hand seat (operator's seat) of a vehicle. Each plate 30 and 50 is rectangular. Each has a length L, a width W, and respective front portions 32, 52 and rear portions 33, 53. Upper plate 30 has flange 35 around its perimeter. Upper plate 30 has a circular recess defining a lower circular surface 36 parallel to the upper surface of plate 30 and having a centerpoint coinciding with axis of rotation 72 and having a diameter D. Between circular surface 36 and the surface of upper plate 30 is conically tapered annular sidewall 37. Circumferentially spaced around tapered sidewall 37 in upper plate 30 are apertures 41 for receiving self-threading screws or other means for securing a bearing, described below, to the swivel plate.

Surface 36 has aperture 38 at its centerpoint through which a swivel post 70 will reside to rotatably attach upper plate 30 and lower plate 50 as more fully described below. The centerpoint resides along the latitudinal center of upper plate 30 rearward of the longitudinal center of upper plate 30.

Disposed in tapered sidewall 37 of upper plate 30 are two slots 42 and 43 located diametrically opposite one another along sidewall 37 closest to flange 35 along length L of upper plate 30. A path defined by the line between opposing slots 42 and 43 passes through the centerpoint and is parallel to front edge 32 of upper plate 30. Disposed in flange 35 of upper plate 30 directly opposite, respectively, slots 42 and 43 of sidewall 37 are notches 44 and 45. Slots 42 and 43, and notch 44 receive swivel actuator arm 100, as described more fully below.

Lower swivel plate 50 is of identical construction to upper swivel plate 30 except that lower swivel plate 50, when operably assembled, is upside-down, so that flange 55 of lower swivel plate 50 is upwardly directed and circular recess surface 56 of lower plate 50 defines a surface parallel to and above the surface of lower plate 50 when lower plate 50 is in its operable position.

Each plate 30 and 50 has affixed thereto, in concentric abutting relationship with respective tapered sidewall surfaces 36 and 56, a substantially annular swivel bearing 80, 90. In this context, annular refers to the general path defined by the bearing surfaces, described below, and is intended to include a bearing which is constructed in a single piece as shown in the preferred embodiment in the illustrations, as well as any number of bearing portions arranged on a respective swivel plate to define a substantially circular bearing surface. Each swivel bearing 80, 90 is identical and preferably manufactured of polypropylene. However, bearings 80, 90 may be composed of any suitable material known to those of ordinary skill in the art which offers appropriate rigidity and frictional characteristics.

As best shown in FIG. 2, annular rings 80 and 90 have, respectively, a front semi-circular half 81, 91 and a rear semi-circular half 82, 92, outer annular surface 83, 93, inner annular surface 84, 94 and bearing surface 85, 95. As best seen in FIGS. 6, 7, 9 and 10, the rear halves 82, 92 of annular bearings 80, 90 are U-shaped in cross-section. Along the periphery of outer surface 83, 93 of annular bearings 80, 90 are circumferentially-spaced arcuate indentations 87, 97 intended to facilitate the manipulation of fasteners (not shown) therein. A feature of bearing rings 80 and 90 is the augmentation of bearing surfaces 85, 95 on front halves 81 and 91, respectively, of upper bearing 80 and lower bearing 90. Circumferentially spaced along bearing surfaces 85, 95 are apertures 17 for securing bearings 80, 90 to plates 30, 50 respectively through apertures 41.

As seen in FIG. 2, lower bearing 90 is fixedly attached to lower swivel plate 50 preferably via self-threading screws or any appropriate means through apertures 17 and apertures 41. Inner surface 84, 94 of bearings 80, 90 has a diameter substantially equal to diameter D around tapered surface 37, 57 of swivel plate 30, 50. Placement and alignment of bearing 80, 90 is therefore easily accomplished due to tapered sidewall 37, 57 of plate 30, 50. Upper bearing 80 is affixed to upper swivel plate 30 in the same fashion. The tapered shoulder 88, 98 of augmented surface 85, 95 abuts tapered sidewall 37, 57 of upper plate 30 and lower plate 50.

Swivel post 70 rotatably secures upper swivel plate 30 and lower swivel plate 50 such that swivel surface 85 of upper bearing 80 is juxtaposed with swivel surface 95 of lower bearing 90. Swivel post 70 also rotatably secures swivel actuator arm 100 to upper swivel plate 30. Bearings 80, 90 are preferably made of polypropylene which provides an excellent bearing surface 85, 95 with minimal friction. However, it has been found that the further use of lithium grease between the two surfaces 85, 95 greatly minimizes frictional forces.

Figure 3:
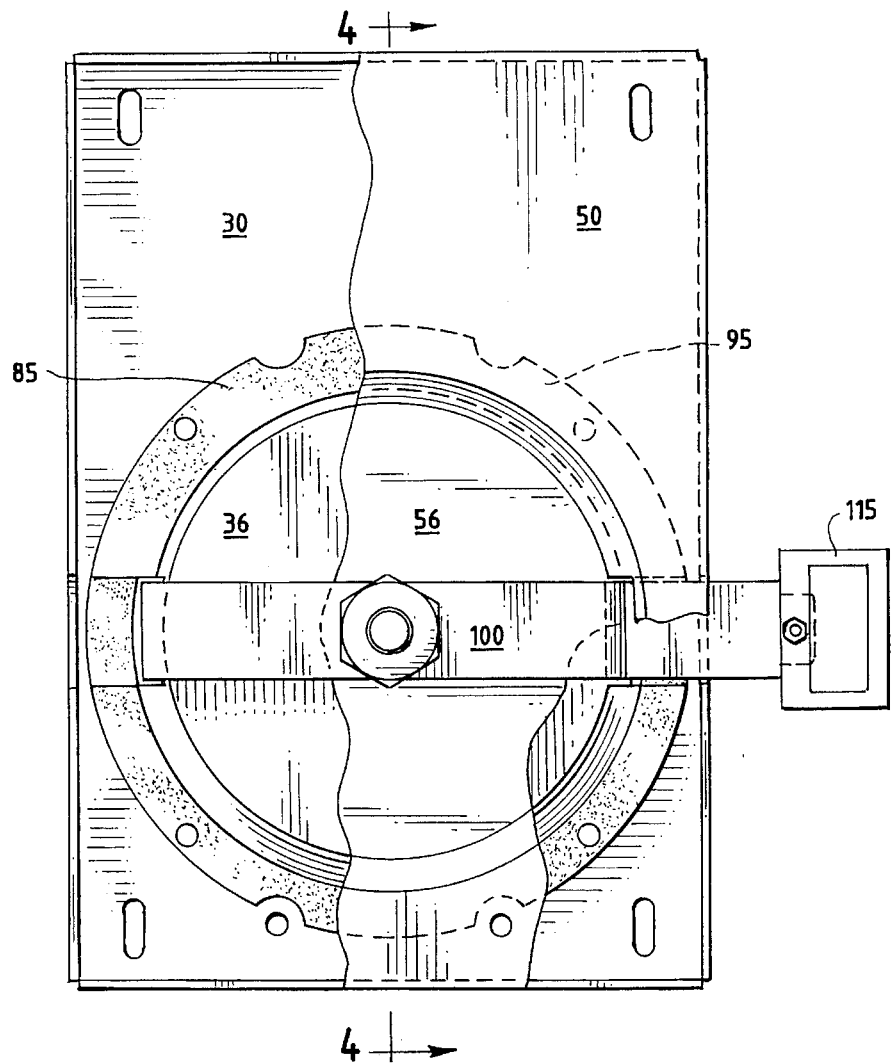
FIG. 3 is a top, partial cutaway view of the apparatus of the present invention.
Figure 4:
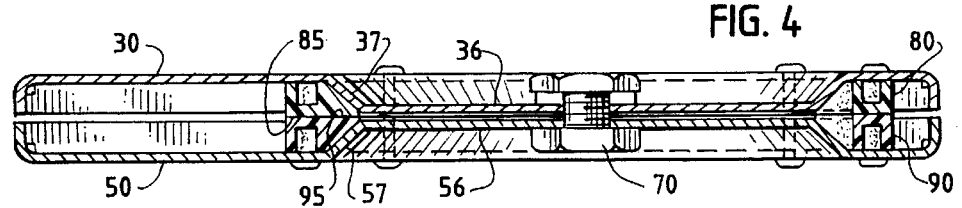
FIG. 4 is a cross-sectional view of the apparatus of the present invention taken along the line 4—4 of FIG. 3.
Figure 4A:
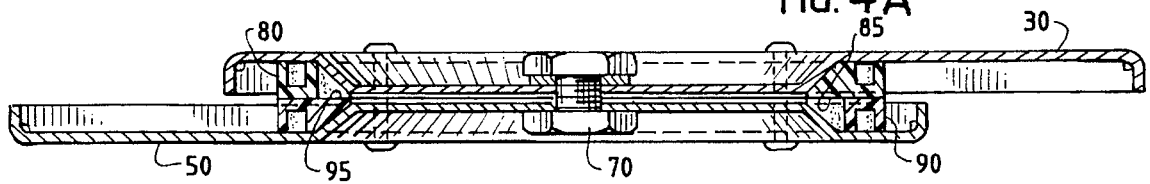
FIG. 4A is a cross-sectional view of the apparatus of the present invention similar to that of FIG. 4 but in a rotated position.

As shown in FIGS. 3, and 4, when upper swivel plate 30 and lower swivel plate 50 are in a nonrotated position, augmented surface 85 of upper bearing 80 and augmented surface 95 of lower bearing 90 are juxtaposed. FIG. 4A shows a cross-sectional view of the swivel seat apparatus of FIG. 4 with upper plate 30 in the rotated position relative to lower plate 50, at which position augmented bearing surface 85 of upper bearing 80 is to the rear (right-hand side in the figure) and, thus, not juxtaposed with augmented bearing surface 95 of lower bearing 90. As will be appreciated by a person of ordinary skill in the art, a seat occupant leaning forward in a seat will create a substantial force about axis 72 and on the front portions of upper and lower swivel plates 30 and 50. Augmented bearing surfaces 81 and 91 provide an augmented area for greater distribution of these moment arm forces, and thus work to provide a more stable seat swivel apparatus.

As best seen in FIGS. 5, 6 and 7, operably attached to upper swivel plate 30 is actuator arm 100. Actuator arm 100 is an elongated, resilient shaft. Actuator arm 100 has latch portion 102, tail portion 104, and body portion 106. Operably assembled, tail portion 104 of arm 100 is disposed within slot 43 in tapered sidewall 37 of upper swivel plate 30. Central portion 106 of arm 100 traverses the axis of rotation 72. Arm 100 has aperture 107 therethrough coaxially aligned with aperture 38 of upper swivel plate 30 and aperture 58 of lower swivel plate 50, defining axis of rotation 72. Swivel post 70 is disposed within aperture 107 of arm 100. Swivel post 70 can be preferably a simple hex-headed bolt, as shown, but any suitable attachment means may be used. The head of swivel post 70 rests against the recessed surface 56 of lower plate 50. The post 70 extends through aperture 107 and terminates at threaded end 73. At threaded end 73, post 70 receives a nylon spacer 75, or any similar spacer having appropriate frictional characteristics as is known to those of ordinary skill in the art, and threaded nut 74 to securely attach upper and lower plates 30, 50. Spacer 75 and nut 74 rest against body portion 106 of arm 100.

As best seen in FIGS. 6 and 7, arm 100 passes through inner slot 42 of tapered sidewall 37 of upper swivel plate 30. Arm 100 has elbow 107 where it travels vertically toward lower bearing 80 approximately 90°. Arm 100 also has a detent 110 formed where arm 100 turns substantially vertically toward upper bearing 90 and then extends laterally beyond side flange 55, thus forming detent 110 and terminating outside of notch 44 of upper plate 30 at handle 115. This latch portion 102 of arm 100 extends along a plane offset from that of the plane formed by body portion 106 of arm 100.

As shown in FIGS. 6, 7, 11 and 12, when upper plate 30 is in a non-rotated position, latch portion 102 of arm 100 resides within the recess defined by shoulder surfaces 99A and 99B of lower bearing 90. As seen in FIG. 6, shoulder surface 99A, toward the front of swivel plate 90, is enlarged due to augmented bearing surface 95 and abuts detent 110. Surfaces 99A and 99B and latch portion 102 thus prevent rotation of lever arm 100 and upper swivel plate 80. When handle 115 of lever arm 100 is lifted by the seat occupant, latch portion 102 of arm 100 is raised above surface 95 of lower bearing 90, thus allowing clockwise rotation (in the direction of arrow A of FIG. 5) of upper plate 30. However, detent 110 does not rise above augmented shoulder surface 99A of lower bearing 90, as seen in FIG. 7. Thus, upper swivel plate 30 can not rotate counterclockwise due to the interaction of detent 110 with augmented shoulder surface 99A of lower bearing 90. Because the rear portion 92 of lower bearing 90 does not have an augmented surface portion, detent 110 can freely rotate clockwise. Thus, detent 110 defines a first stop member and augmented shoulder surfaces 86A, 86B, 96A, 96B define second stop members for limiting rotation of upper plate 30 relative to lower plate 50.

Lifting handle 115 of lever arm 100 will thus allow uninhibited 180° clockwise rotation of upper swivel plate 30 until latch portion 102 of arm 100 reaches opposing indentation 96 of lower bearing 90. At that point, detent 110 of arm 100 will contact augmented shoulder surface 96A of indentation 96 of lower bearing 90 which prevents further rotation of upper swivel plate 30. At that point, by releasing handle 115, latch portion 102 will fall into place, via spring force of substantially resilient arm 100, and reside within indentation 96 of lower bearing 90 to prevent any further rotation. Shoulder surfaces 96A and 96B of indentation 96 prevent further clockwise or counterclockwise rotation until the seat occupant lifts handle 115. Lifting handle 115 disengages latch portion 102 of lever arm 100 from indentation 96 of lower bearing 90 while not preventing detent 110 from engaging augmented shoulder surface 96A of indentation 96. Thus, when in this position, lifting handle 115 will allow counterclockwise rotation of upper plate 30 but will not allow clockwise rotation. Upper plate 30 may then rotate 180° counterclockwise until lever arm 100 again resides within indentation 97 of lower bearing 90 to prevent further rotation of upper plate 30.

Figure 8:
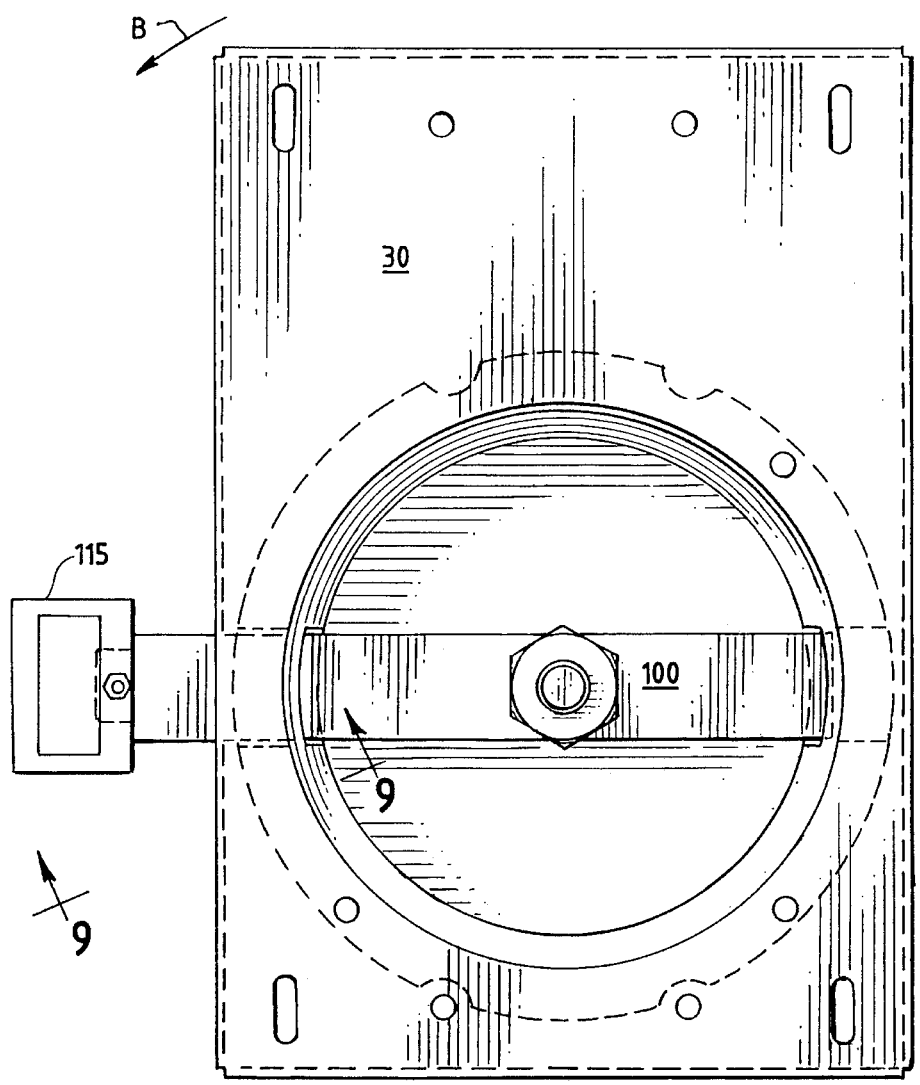
FIG. 8 is a top view of the apparatus of the present invention as assembled for the passenger's seat of a vehicle.
Figure 9:
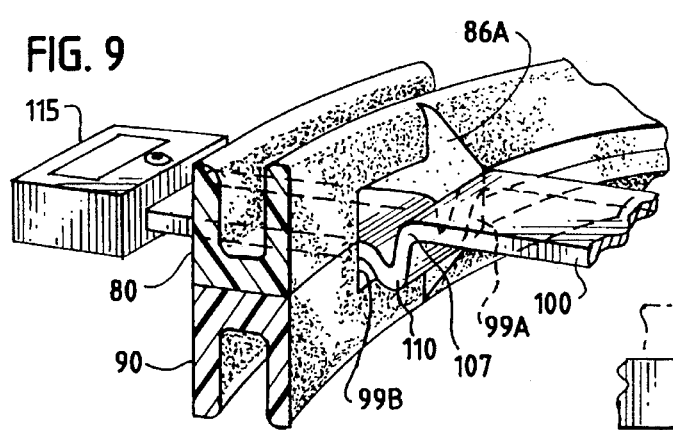
FIG. 9 is a partial cutaway, perspective, view of the bearings and actuator lever of the present invention taken along the line 9—9 of FIG. 8.
Figure 10:
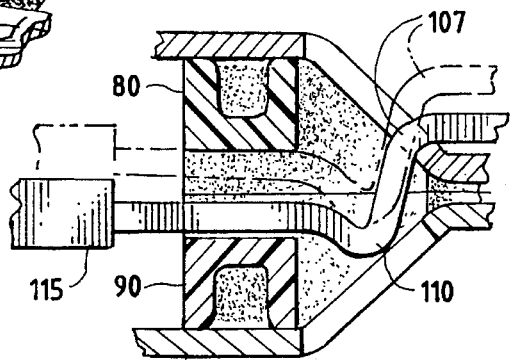
FIG. 10 is a partial, cross-sectional view of the apparatus of the present invention showing the lever arm in the latched and actuated positions.

As has been described, arm 100 allows one-way 180° rotation of upper plate 30 relative to lower plate 50 and back again. As shown in FIGS. 8, 9, and 10, upper and lower plates 30, 50 can be reversed, with lever arm 100 attached to the now upper swivel plate 90 and protruding to the left-hand side of the apparatus for rotation of a vehicle seat on the passenger side of a vehicle. As shown, arm 100 resides in the upper swivel plate 90 and, identically to that described with reference to FIGS. 5, 6, and 7, allows only counterclockwise rotation, as shown by arrow B in FIG. 8. It will be appreciated to those of ordinary skill in the art that the swivel apparatus of the present invention just described is easily assembled with lower plate 90 as the upper swivel plate and upper plate 80 as the lower swivel plate and with actuator arm 100 operably attached to the upper plate 90 so that the upper plate may swivel 180° in the counterclockwise direction and back again.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A seat swivel apparatus, comprising:
    upper and lower swivel plates, said upper plate being adapted to support a seat and said lower plate being adapted to mount to a support structure;
    a first generally annular bearing disposed in fixed position on said lower plate and having an upward facing generally planar first bearing surface;
    a second generally annular bearing disposed in fixed position on said upper plate and having a downward facing generally planar second bearing surface; said first and second bearing surfaces being juxtaposed to permit said upper plate to rotate relative to said lower plate, and each said surface having aligned diametrically opposed recesses;
    a swivel actuator lever mounted to and movable with one of said plates, said lever having a latch portion engageable with the recesses of the bearing disposed in the other of said plates to thereby prevent rotation of said upper plate.

2. The swivel apparatus of claim 1 wherein each of said plates includes a recess defining an inwardly extending annular shoulder, and wherein each of said bearings is positioned adjacent one of said shoulders.

3. The swivel apparatus of claim 2 wherein said lever is located externally of said one plate and extends through an aperture in said one plate to thereby engage the bearing disposed in the other plate.

4. The swivel apparatus of claim 1 wherein said upper and lower plates are of substantially identical configuration.

5. The swivel apparatus of claim 1 wherein said first and second bearings are of substantially identical configuration.

6. The swivel apparatus of claim 1 wherein said lever is spring biased toward the bearing disposed in the other of said plates.

7. The swivel apparatus of claim 1 further including first and second stop members positioned to permit only limited rotation of said upper plate relative to said lower plate.

8. The swivel apparatus of claim 7 wherein said first stop member is associated with said lever and said second stop member is associated with either the bearing disposed in the other plate or the other plate itself.

9. The swivel apparatus of claim 1 wherein the axis of rotation of said plates is located rearward of the center point of said plates.

10. The swivel apparatus of claim 1 wherein said lever includes an inwardly extending detent and said bearing disposed in the other plate includes a stop member, said detent and said stop member being positioned such that when said latch portion is disengaged from said recesses, the upper plate is capable of only limited rotation relative to said lower plate.

11. The swivel apparatus of claim 10 wherein said stop member comprises a radially-extending flange and said upper plate is capable of about 180° rotation.

12. The swivel apparatus of claim 1 wherein each said first and second bearing has a forward semicircular portion having an enlarged bearing surface.

13. The swivel apparatus of claim 1 wherein a lithium grease is disposed between said first and second bearing surfaces.

* * * * *